US006850736B2

(12) United States Patent
McCune, Jr.

(10) Patent No.: US 6,850,736 B2
(45) Date of Patent: Feb. 1, 2005

(54) METHOD AND APPARATUS FOR RECEPTION QUALITY INDICATION IN WIRELESS COMMUNICATION

(75) Inventor: Earl W. McCune, Jr., Santa Clara, CA (US)

(73) Assignee: Tropian, Inc., Cupertino, CA (US)

( * ) Notice: Subject to any disclaimer, the term of this patent is extended or adjusted under 35 U.S.C. 154(b) by 318 days.

(21) Appl. No.: 09/746,257

(22) Filed: Dec. 21, 2000

(65) Prior Publication Data

US 2002/0081977 A1 Jun. 27, 2002

(51) Int. Cl.[7] .............................................. H04B 17/00
(52) U.S. Cl. ............................. 455/67.13; 455/67.11; 455/226.3; 370/333
(58) Field of Search ........................... 455/67.13, 67.7, 455/226.4, 67.14, 115.4, 115.3, 134, 133, 135, 226.2, 226.3, 423, 298, 310, 63.1; 370/333; 324/614

(56) References Cited

U.S. PATENT DOCUMENTS

| | | | |
|---|---|---|---|
| 4,744,083 A | * | 5/1988 | O'Neill et al. ............... 714/704 |
| 5,138,616 A | * | 8/1992 | Wagner et al. ............... 714/704 |
| 5,201,062 A | * | 4/1993 | Nakamura et al. ........ 455/67.13 |
| 5,214,687 A | * | 5/1993 | Kansakoski et al. ........ 455/425 |
| 5,630,210 A | * | 5/1997 | Marry et al. .............. 455/67.13 |
| 5,809,399 A | * | 9/1998 | Tuutijarvi et al. .......... 455/63.1 |
| 5,950,139 A | * | 9/1999 | Korycan ..................... 455/566 |
| 5,991,901 A | * | 11/1999 | Mulford et al. ............. 714/704 |
| 6,035,183 A | * | 3/2000 | Todd et al. ............... 455/226.2 |
| 6,141,388 A | * | 10/2000 | Servais et al. ............... 375/262 |
| 6,167,031 A | * | 12/2000 | Olofsson et al. ............. 370/252 |
| 6,173,161 B1 | * | 1/2001 | Gross, Jr. ................. 455/67.13 |
| 6,243,568 B1 | * | 6/2001 | Detlef et al. ............. 455/226.4 |
| 6,363,245 B1 | * | 3/2002 | Natori ..................... 455/226.3 |

FOREIGN PATENT DOCUMENTS

| | | | | |
|---|---|---|---|---|
| EP | 0942572 A2 | | 3/1999 | ............ H04M/1/72 |
| GB | 2 328 842 A | * | 3/1999 | ............ H04Q/7/34 |

OTHER PUBLICATIONS

Copy of PCT Written Opinion.

* cited by examiner

*Primary Examiner*—Charles Appiah
(74) *Attorney, Agent, or Firm*—Thelen Reid & Priest, LLP (57) ABSTRACT

An apparatus (135), method and computer program are provided for determining and indicating a quality of a signal received by a first wireless communication device (105) from a second wireless communication device (110). In one embodiment, the apparatus (135) includes a bit-error-rate (BER) circuit (215) for measuring a BER of the signal, a comparator (145) for comparing the BER with a predetermined value to determine a relative signal quality, and an indicator (160) for indicating the quality of the signal to a user of the first device (105). Alternatively, the apparatus (135) includes a circuit for measuring the strength of the signal (230), a calculator (235) for calculating a signal-to-noise ratio (SNR) of the signal using the strength of the signal and a predetermined noise value, and a comparator (145) for comparing the SNR with a predetermined value to determine a relative signal quality. Signal quality is indicated by activating a number of characters (210) corresponding to the relative signal quality.

13 Claims, 5 Drawing Sheets

METHOD AND APPARATUS FOR RECEPTION QUALITY INDICATION IN WIRELESS COMMUNICATION

FIELD

The present invention relates generally to wireless communication systems, and more particularly to a method and apparatus for indicating signal quality of a signal received by a first wireless communication device from a second wireless communication device.

BACKGROUND

Recent years have seen explosive growth in the use of wireless communication systems. For example, wireless systems are commonly used in mobile telecommunication systems, such as cellular and personal communication systems (PCS), to provide voice communication, in wireless modems and network connections enable the transfer of data without a physical link between computers, and in satellite systems to transmit and receive audio and television programming.

A common feature of wireless communication systems is that a wireless device, a receiver or transceiver, often includes an apparatus or circuit for determining a quality of the received signal. Occasionally this determination of received signal quality is displayed in some manner to the user of the wireless device. One example is a bar graph on a mobile phone display that typically consists of four display characters or bars to indicate relative signal quality. In this type of display, the four bars are selectively activated or displayed in response to the internal determination of relative signal quality. None of the bars are activated if the received signal quality is unacceptable, one bar indicates a low quality signal relative to an optimal received signal quality, two bars a medium quality signal, and so on until all bars are activated indicating the optimal received signal quality.

In conventional wireless systems, the determination of relative signal quality is accomplished by simply measuring the strength of the received signal. The general understanding is that a strong received signal provides a higher quality of communication than a weak received signal. Thus, providing and displaying a received signal strength indication (RSSI) allows the user of the wireless device to determine the utility of the device for communication at any particular time. The strength of the received signal can be determined, for example, using the feedback signal of an automatic gain control (AGC) loop, or an output from a detecting logarithmic amplifier.

Figure 1:
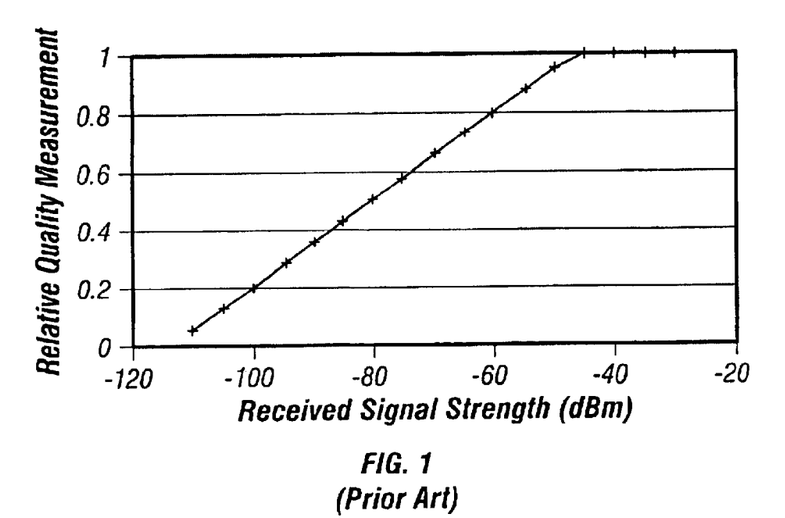
FIG. 1 (prior art) is a graph of relative quality measurement of a signal versus received signal strength for a conventional wireless communication system.

A graph of relative signal quality of a signal versus received signal strength for a conventional wireless communication system is shown in FIG. 1. Referring to FIG. 1, it is seen that a received signal strength of between about −110 and about −100 dBm yields a relative signal quality of between 0 and 0.2 times that of an optimal signal, and would be indicated to the user by activating none of the bars in the received signal quality display. A received signal strength of between about −100 and about −85 dBm yields a relative signal quality of between 0.2 and 0.4 times that of the optimal signal, and would be indicated to the user by activating a single bar in the received signal quality display. A received signal strength of between about −85 and about −75 dBm yields a relative signal quality of between 0.4 and 0.6 times that of an optimal signal, and would be indicated to the user by activating two bars. A received signal strength of between about −75 and about −60 dBm yields a relative signal quality of between 0.6 and 0.8 times that of the optimal signal, and is indicated to the user by activating three of the bars. A received signal strength of between about −60 and about −45 dBm yields a relative signal quality of between 0.8 and 1 times that of the optimal signal, and is indicated by activating all of the bars in the received signal quality display.

One shortcoming of the above approach, as discovered by the inventor of the present invention, is that RSSI is a poor indicator of the actual quality of communication available from a received radio signal.

In cellular applications, cellular operators wish to use power control on the base-station transmitters to minimize interference in the system. Reduced signal strength is likely to have no impact on actual communications quality (acutally enhancing overall signal/interference ratio—SIR—in the network). However, customers do notice that the RSSI has dropped, and mistakenly interpret this as a drop in network communications quality. If the visual indicator were truly indicative of actual communications quality (which would not have changed, or would have improved), this concern would be alleviated.

U.S. Pat. No. 5,289,178 discloses the display of a "raw" bit-error rate in a paging receiver. However, it does not suggest the display of "link classification" based on the effective (i.e., corrected) bit-error rate in a coded communications system such as a cellular telephone system.

Accordingly, there is a need for an apparatus and method for determining and indicating received signal quality that more accurately reflects the quality of communication available from a received signal. It is desirable that the apparatus and method be suitable for use with a broad range of wireless communication systems including telecommunication systems, wireless modems and satellite systems. It is also desirable that the apparatus and method is usable with existing infrastructure, such as telecommunication base stations, with little or no modification to the infrastructure. It is further desirable that the apparatus and method is compatible with display methods now used in wireless devices.

SUMMARY

The present invention provides an apparatus and method for determining and indicating received signal quality for use in a wireless communication system.

In one aspect the invention is directed to a received signal quality indicator (RSQI) apparatus for determining a quality of a signal received by a first wireless communication device from a second wireless communication device. Generally, the RSQI apparatus includes means for determining a quality of a signal received by the first wireless communication device from the second wireless communication device relative to a predetermined value, and means for indicating to a user of the first wireless communication device the quality of the signal. Preferably, the signal includes an identifier, such as an area identity number, that is automatically and regularly transmitted from the second wireless communication device to the first wireless communication device. More preferably, the RSQI apparatus is adapted to determine the quality of the signal using the identifier as received by the first wireless communication device, whereby the quality of the signal is indicated to the user before the user initiates communication between the first wireless communication device and the second wireless communication device.

In one embodiment, the signal is digital signal having error detection/correction features. The means for determining the quality of a signal includes a bit-error-rate circuit for measuring a bit-error-rate of the signal, and a comparator for comparing the bit-error-rate of the signal to a predetermined value to determine a relative quality of the signal. The means for indicating the quality of the signal is an indicator adapted to indicate to the user of the first wireless communication device the quality of the signal. In one version of this embodiment, the predetermined value is a predetermined bit-error-rate, and the comparator is adapted to divide the predetermined bit-error-rate by the bit-error-rate of the signal to determine the relative quality of the signal. The indicator is a display having a plurality of display characters, and is adapted to activate a number of the display characters corresponding to a result of the predetermined bit-error-rate divided by the bit-error-rate of the signal. Alternatively, the predetermined value includes several predetermined values in a look-up table in a memory in the first wireless communication device, and the comparator is adapted to compare the bit-error-rate of the signal to the predetermined values in the look-up table. In this version of the embodiment, the indicator obtains the number of display characters to be activated directly from the look-up table.

In another embodiment, the means for determining the quality of a signal includes a signal strength circuit for measuring the strength of the signal, a calculator for calculating a signal-to-noise ratio of the signal using the strength of the signal and a predetermined noise value, and a comparator for comparing the signal-to-noise ratio of the signal to a predetermined value to determine a relative quality of the signal. The strength of the signal is measured using, for example, a feedback signal of an automatic gain control (AGC) loop, or an output from a detecting logarithmic amplifier. In one version of this embodiment, the predetermined value is a predetermined signal-to-noise ratio, and the comparator is adapted to divide the measured signal-to-noise ratio by the predetermined signal-to-noise ratio. The indicator is adapted to activate a number of the display characters corresponding to the result of the division. Alternatively, the predetermined value is a number of predetermined values in a look-up table in memory, and the measured signal-to-noise ratio is compared to the values in the look-up table and the corresponding number of display characters activated.

In another aspect, the invention is directed to a method for indicating received signal quality using the RSQI apparatus of the present invention. In the method, a signal from the second wireless communication device is received in the first wireless communication device. The quality of the signal relative to a predetermined value is determined, and indicated to the user of the first wireless communication device. Preferably, the signal includes an identifier, as noted above, and the step of measuring a bit-error-rate of the signal involves the step of measuring the bit-error-rate in the identifier, so that the quality of the signal is indicated to the user before the user initiates communication between the first and second wireless communication devices.

In one embodiment, the signal includes error detection/correction features, and determining the quality of the signal is accomplished by measuring a bit-error-rate of the signal and comparing it to the predetermined value. In one version, the predetermined value is a predetermined bit-error-rate, and comparing the bit-error-rate of the signal to the predetermined value involves dividing the predetermined bit-error-rate by the bit-error-rate of the signal. Indicating the quality of the signal to the user involves the activating a number of display characters corresponding to a result of the predetermined bit-error-rate divided by the bit-error-rate of the signal. Alternatively, the predetermined value is number of predetermined values in a look-up table, and comparing the bit-error-rate of the signal to the predetermined value involves comparing the bit-error-rate to values in the look-up table. The quality of the signal is indicated to the user by obtaining from the look-up table a number of display characters to be activated.

In another embodiment, determining a quality of the signal involves measuring a signal-to-noise ratio of the signal by (i) measuring strength of the signal and (ii) calculating the signal-to-noise ratio of the signal using the strength of the signal and a predetermined noise value. In one version of this embodiment, the predetermined value includes a predetermined signal-to-noise ratio, and the quality of the signal is determined by comparing the signal-to-noise ratio of the signal to the predetermined signal-to-noise ratio. Preferably, the signal-to-noise ratio of the signal is divided by the predetermined signal-to-noise ratio, and a number of display characters corresponding to a result of this division activated to indicate the quality of the signal to the user of the first wireless communication device. Alternatively, the predetermined value is number of predetermined values in a look-up table, and comparing the signal-to-noise ratio of the signal to the predetermined value involves comparing the signal-to-noise ratio to values in the look-up table. The quality of the signal is indicated to the user by obtaining from the look-up table a number of display characters to be activated.

The advantages of the present invention include: (i) more accurate determination and indication of received signal quality, by measuring the signal parameter(s) that matter in actually performing communication, such as BER for a digital system, or SNR for an analog system, (ii) adaptable for use with a broad range of wireless communication systems with little or no modification to the infrastructure of the system and (iii) compatibility with existing display methods to avoid burdening users with the need to familiarize themselves with a new metric.

BRIEF DESCRIPTION OF THE DRAWINGS

These and various other features and advantages of the present invention will be apparent upon reading of the following detailed description in conjunction with the accompanying drawings, where.

DETAILED DESCRIPTION

The present invention is directed to an apparatus and method capable of determining and indicating received signal quality for use in a wireless communication system.

Figure 2:
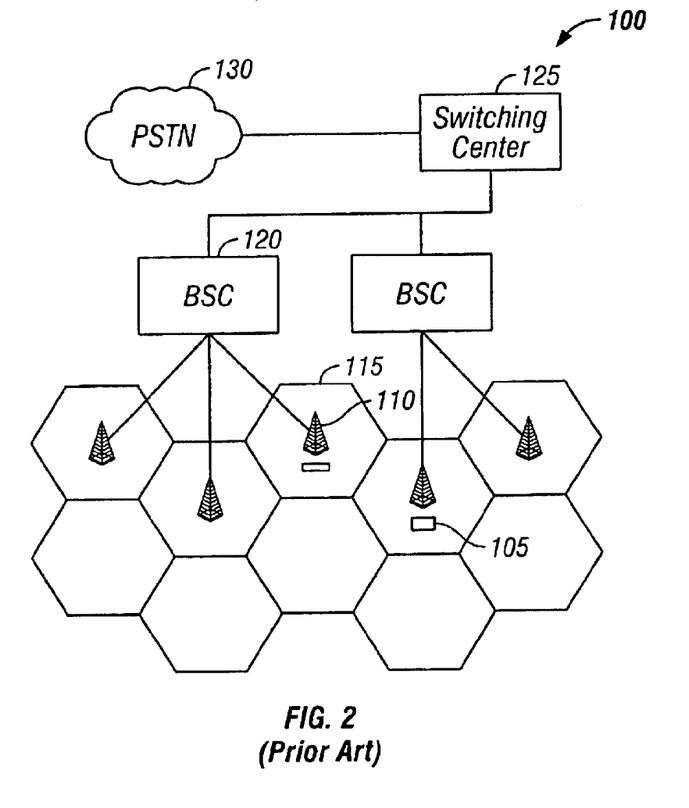
FIG. 2 (prior art) is a block diagram of wireless communication system for which a received signal quality indicator and method according to an embodiment of the present invention is particularly useful.

FIG. 2 shows an exemplary block diagram of a wireless communication system 100, here a mobile telecommunication system or system, for which a received signal quality indicator and method according to an embodiment of the present invention are particularly useful. For purposes of clarity, many of the details of mobile telecommunication systems that are widely known and are not relevant to the present invention have been omitted. Mobile telecommunication systems, and bit-error rate estimation in particular, are described in more detail in, for example, U.S. Pat. No. 6,163,571, which is incorporated herein by reference.

Referring to FIG. 2, the wireless communication system 100 generally includes a number of first wireless communication devices or mobile handsets 105, and one or more second wireless communication devices or base stations 110 distributed over a geographic area to form cells 115. The base stations 110 are coupled through base station controllers 120 to a switching center 125 that is connected to a public switched telephone network (PSTN 130) and routes telephone calls to the base station covering a cell 115 occupied by the called or calling handset 105. To enable the system 100 to locate a particular handset 105 each transceiver, that is each base station 110 and handset, in the system has its own unique identifying number. For example, each base station 110 has an area identity number that it transmits regularly as part of the system's 100 control information. Upon switching on, a handset 105 will lock onto the signal of the nearest base station 110 and identify itself to the system 100 by transmitting a registration number to the base station. As it moves from cell 115 to cell the handset 105 selects new base stations 110 to lock onto. The handset 105 checks the area identity number transmitted by the base station 110, and when it detects a change indicating that it has moved to a new cell 115, it will automatically inform the system 100 of its new location by means of a signaling interchange with the base station. In this way, the system can keep a record (registration) of the current cell 115 in which each handset 105 is located, and therefore will only need to call the handset within that cell.

Figure 3:
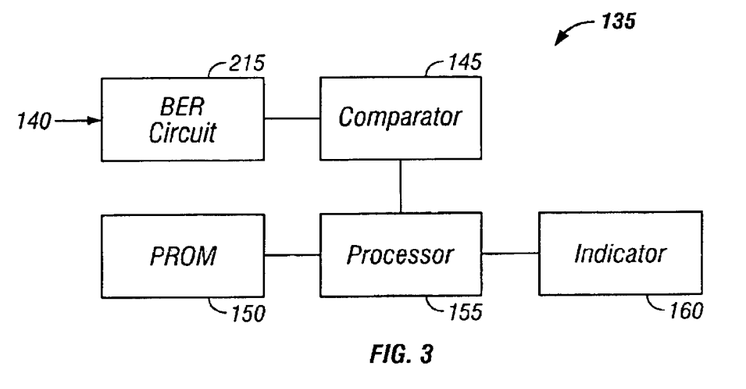
FIG. 3 is a block diagram of an apparatus for generating and displaying a received signal quality indication according to an embodiment of the present invention.

FIG. 3 is a block diagram of a Received Signal Quality Indicator (RSQI) circuit or apparatus 135 for continuously monitoring, measuring and displaying the signal quality received from the base station 110 in accordance with the present invention. Generally, the RSQI apparatus 135 includes a circuit for measuring one or more characteristics of the received signal 140, a comparator 145 for comparing the signal characteristic to a predetermined value, a computer program or program embedded in a programmable read-only-memory (PROM 150), a processor 155 for executing the program and an indicator 160 for indicating to a user the signal quality. The measured signal characteristics may be averaged, if desired, to reduce the natural variations of the measured signal characteristics and more accurately represent the prevailing conditions. Preferably, the processor 155, which is included in many existing handset designs, performs the measuring function and serves as the comparator 145, thereby enabling existing designs to be easily modified to implement the RSQI apparatus 135 of the present invention.

Figure 4:
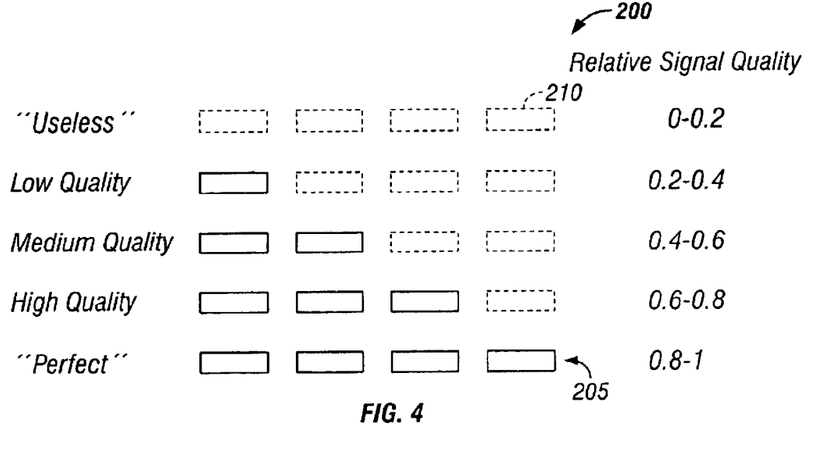
FIG. 4 is a block diagram of a display for displaying received signal quality indication according to an embodiment of the present invention.

The indicator 160 may be either an audible indicator in which an audible tone changes in volume or frequency to indicates signal quality, or a visual indicator. In a preferred embodiment, shown in FIG. 4, the indicator 160 is a display 200 capable of visually indicating signal quality information to the user. The display 200 generally includes a bar graph 205 consisting of from about three to about six display characters 210, and, in a typical mobile handset 105, is implemented using liquid crystal or light-emitting diode technology. FIG. 4 shows examples of the appearance of the bar graph 205 for five different RSQI values. In this figure, the display 200 has four display characters 210 from zero to four of which are activated to indicate signal quality to the user. In FIG. 4 activated display characters 210 appear as completely shaded while display characters that are not activated shown by phantom lines. Each activated display character represents 20% of a RSQI range. In a first example, none of the display characters 210 are activated thereby indicating the signal is useless, having a quality of less than 20% of that of an optimal signal, and making communication impossible. A second example, with a single display character 210 activated shows a low quality signal having from twenty to forty percent of optimum. A third example, with two display characters 210 activated shows a medium quality signal having from forty to sixty percent of optimum. A fourth example, with three display characters 210 activated indicates a high quality signal having from sixty to eighty percent of optimum. A fifth example, with all four display characters 210 activated shows a near perfect quality signal having a signal quality from eighty to one hundred percent of optimum.

In one embodiment, the signal is a digital signal having a number of multi-bit bytes, each byte including one or more error checking bits. The error checking bits can include either parity bits or cyclic redundancy bits, such as a Hamming code. In this embodiment, the RSQI apparatus 135 includes a bit-error-rate circuit 215 for checking the error checking bits and calculating a bit-error-rate of the signal. The comparator 145 is configured to compare the measured bit-error-rate to the predetermined value. In one version of this embodiment, the predetermined value is a predetermined bit-error-rate, and the comparator 145 is adapted to divide the predetermined bit-error-rate by the bit-error-rate of the signal to determine the relative quality of the signal. The indicator 160 is adapted to activate a number of the display characters 210 corresponding to the result of the division. The value of the predetermined bit-error rate is chosen to equal that of a near perfect or substantially error free signal. By a near perfect signal it is meant a signal that provides communication with substantially no discernable errors or pauses in the communication. It has been found that for voice communication over a mobile telecommunication system a signal having a bit-error probability of from about 0.0002 to about 0 will provide a communication with substantially no discernable errors or pauses in the communication. For example, a signal having a measured bit-error probability of 1% (0.01) would have a signal quality of 50 percent when compared with that of an optimal signal having a bit-error probability of 0.01% (0.0001). Thus, in accordance with the present invention the indicator 160 would activate two of the four display characters 210 indicating to the user of the handset 105 a medium quality signal.

In an alternative embodiment, the RSQI apparatus 135 further includes a memory (not shown) and the predetermined value includes an number of predetermined bit-error-rates stored in a lookup table in the memory. Each of the predetermined bit-error-rates is associated with a relative signal quality expressed as a fraction or percentage of an optimal signal that can be passed to the indicator 160. Thus, the comparator 145 performs a lookup of the measured bit-error-rate to determine the relative signal quality. For example, the look up table can include four predetermined bit-error probabilities of 0.04, 0.015, 0.007 and 0.002 to divide the range of possible signal qualities into five zones. Thus, a signal having a measured bit-error probability lower than 0.04, the highest predetermined bit-error-rate, but greater than 0.015, the second highest predetermined bit-error probability, would have a relatively low signal quality. While a lookup for a signal having a measured bit-error probability of 0.001, lower than the lowest predetermined bit-error probability, would have a near perfect signal quality. In one version of this embodiment, the lookup table includes associated with each zone a number of display characters 210 to be activated by the indicator to indicate the relative signal quality.

Figure 5:
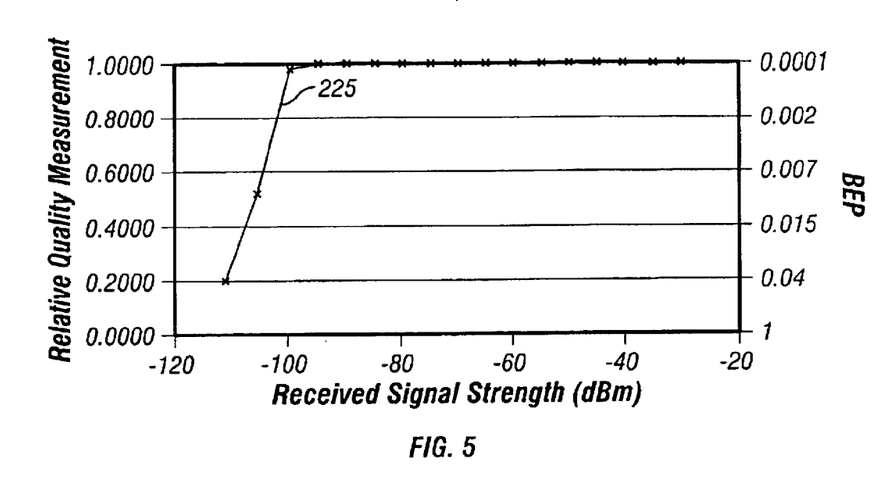
FIG. 5 is a graph of relative quality measurement of a digital signal versus received signal strength for a wireless communication system using a bit-error-rate of the signal according to an embodiment of the present invention.

Advantages of the RSQI apparatus 135 using a bit-error-rate of the received of the present invention are illustrated by FIG. 5. FIG. 5 is an exemplary graph of bit error probability of a digital signal, indicated by line 225, versus received signal strength showing a rapid improvement in relative signal quality. Referring to FIG. 5, it is seen that as signal strength increases from about −110 dBm to about −100 dBm the bit-error-probability of the received signal drops rapidly from about 0.04 to about 0. In this example a signal having a signal having a received signal strength of about −110 dBm would have a bit-error-probability of about 0.04, and a relative signal quality of about 0.2 or 20% of that of an optimal or near perfect signal. Using the display described above this low quality signal would be indicated to the user by activating a single display character 210. At an opposite end of the RSQI range a signal having a received signal strength of about −90 dBm would have a bit-error-probability of about zero, and an optimal relative signal quality that would be indicated to the user by activating all display characters 210. It is important to note that the graph in FIG. 5 is provided only to illustrate the rapid improvement in relative signal quality for even slight increases in received signal strength, and the more accurate representation of such by the RSQI apparatus 135 of the present invention. Received signal strength is not used by the RSQI apparatus 135 in this embodiment to develop the relative signal quality metric of the present invention.

Note that using bit errors as the signal quality metric automatically takes into account other channel degradations such as mutlipah distortion, co-channel interference, and the like. The SNR technique does not, and so it is less preferred.

Figure 6:
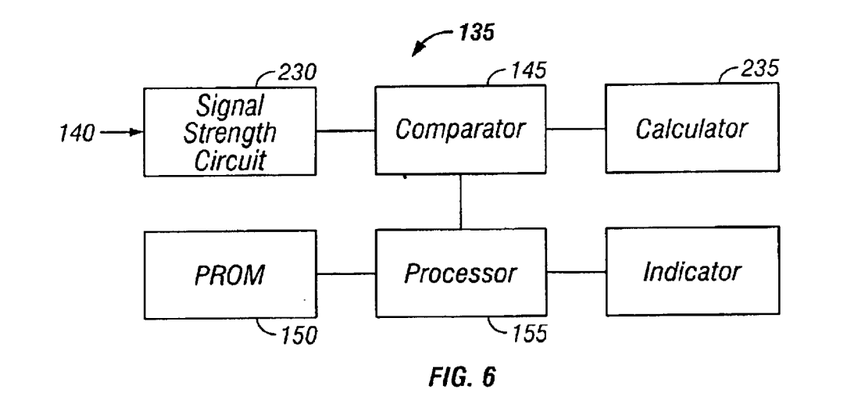
FIG. 6 is a block diagram of an apparatus for generating and displaying a received signal quality indication using signal-to-noise ratio according to an embodiment of the present invention.

In another embodiment, shown in FIG. 6, the relative signal quality of a received signal is developed using a signal-to-noise ratio of the signal using the strength of the signal. FIG. 6 is a block diagram of an alternative embodiment of the RSQI apparatus 135 for generating and displaying a received signal quality indication using signal-to-noise ratio according to the present invention. In this embodiment, the RSQI apparatus 135 includes a signal strength circuit 230 for measuring the strength of the signal, rather than a bit-error-rate circuit 215, and further includes a calculator 235 for calculating a signal-to-noise ratio of the signal using the strength of the signal and a predetermined noise value. The comparator 145 compares the signal-to-noise ratio of the signal to a predetermined value to determine a relative quality of the signal. The strength of the signal is measured using, for example, a feedback signal of an automatic gain control (AGC) loop (not shown), or an output from a detecting logarithmic amplifier (not shown). This embodiment is particularly useful for wireless communication systems with analog signals such as amplitude and frequency modulated radio, analog cellular phones, and some satellite systems.

In one version of this embodiment, the predetermined value is a predetermined signal-to-noise ratio, and the comparator 145 is adapted to divide the measured signal-to-noise ratio by the predetermined signal-to-noise ratio. The indicator 160 is adapted to activate a number of the display characters 210 corresponding to the result of the division. The value of the predetermined signal-to-noise ratio is chosen to equal that of a near perfect or substantially error free signal. It has been found that for voice communication over a mobile telecommunication system a signal having a signal-to-noise ratio of from about 15 dB to about 20 dB will provide a communication with substantially no discernable errors or pauses in the communication. For example, a signal having a measured signal-to-noise ratio of 13 dB, would have a signal quality of 50 percent when compared with that of an optimal signal having a signal-to-noise ratio of 20 dB. Thus, in accordance with the present invention the indicator 160 would activate two of the four display characters 210 indicating to the user of the handset 105 a medium quality signal.

In an alternative embodiment, similar to that described above for use with digital signals, the RSQI apparatus 135 further includes a memory (not shown) and the predetermined value includes an number of predetermined signal-to-noise ratios stored in a lookup table in the memory. Each of the predetermined signal-to-noise ratio is associated with a relative signal quality expressed as a fraction or percentage of an optimal signal that is passed to the indicator 160.

Figure 7:
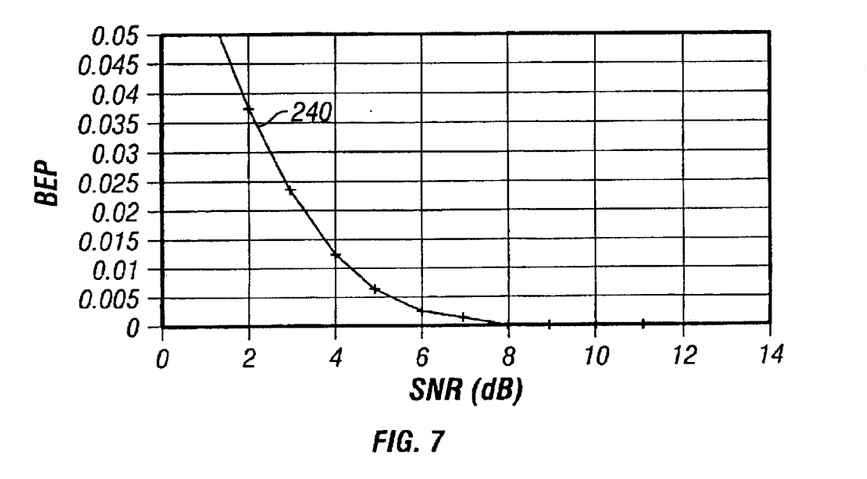
FIG. 7 is a graph of bit error probability of a signal versus signal to noise ratio for a digital wireless communication system according to an embodiment of the present invention.

Advantages of the RSQI apparatus 135 using a signal-to-noise ratio of the received of the present invention are illustrated by FIG. 7. FIG. 7 is an exemplary graph of bit error probability of a signal, indicated by line 240, versus signal-to-noise ratio of the received signal showing a rapid improvement in relative signal quality. Referring to FIG. 7, it is seen that as signal-to-noise ratio increases from about 1.5 dB to about 8 dB the bit-error-probability of the received signal drops rapidly from about 0.05 to nearly 0. In this example a signal having a signal having a signal-to-noise ratio of about 2 dB would have a bit-error-probability of about 0.037, and a relative signal quality of about 0.22 or 22% of that of an optimal signal. This low quality signal would be indicated to the user by activating a single display character 210. At an opposite end of the RSQI range a signal having a signal-to-noise ratio of about 8 dB would have a bit-error-probability of about 0.0002, and an optimal relative signal quality that would be indicated to the user by activating all display characters 210.

A method or process for operating the RSQI apparatus 135 to determine and indicate the quality of communication available from a received signal will now be described with reference to FIG. 8 and FIG. 9. The method generally involves receiving in the first wireless communication device 105 a signal from the second wireless communication device 110, determining a quality of the signal relative to a predetermined value, and indicating to a user of the first wireless communication device the quality of the signal. Preferably, the signal includes an identifier, such as an area identity number, so that the quality of the signal is indicated to the user before the user initiates communication between the first and second wireless communication device 105, 110.

Figure 8:
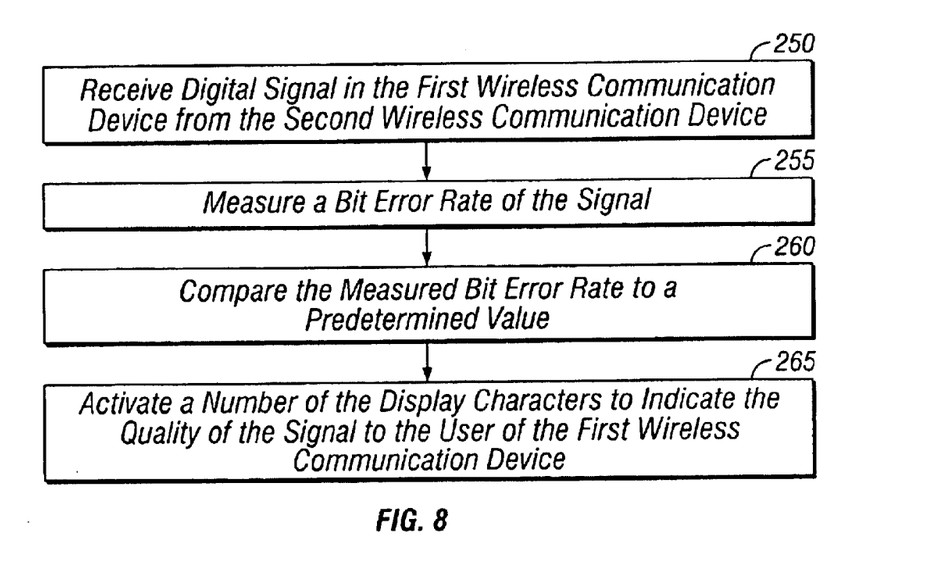
FIG. 8 is a flowchart of a method for generating and displaying a received signal quality indication using bit-error-rate according to the embodiment of the present invention.

FIG. 8 is a flowchart of a method for generating and displaying a received signal quality indication using a bit-error-rate of the signal according to the embodiment of the present invention. Referring to FIG. 8, a digital signal is received in the first wireless communication device 105 from the second wireless communication device 110. (step 250) The quality of the signal is determined by measuring a bit-error-rate of the signal (step 255) and comparing the bit-error-rate to the predetermined value. (step 260) The signal has error detection/correction features, and measuring the effective (corrected) bit-error-rate of the signal involves error detection/correction and other steps detailed elsewhere, such as in the previously-referenced patent. In one embodiment, the predetermined value is a predetermined bit-error-rate, and comparing the bit-error-rate of the signal to the predetermined value may include the step of dividing the predetermined bit-error-rate by the bit-error-rate of the signal. The quality of the signal is indicated to the user of the first wireless communication device 105 by activating a number of the display characters 210 corresponding to the result of the measured bit-error-rate of the signal and its subsequent comparison step. (step 265) In another embodiment, (not shown) comparing the bit-error-rate of the signal to the predetermined value is accomplished by comparing the bit-error-rate of the signal to the look-up table to determine the quality of the signal involves obtaining from the look-up table a number of the display characters 210 to be activated.

Figure 9:
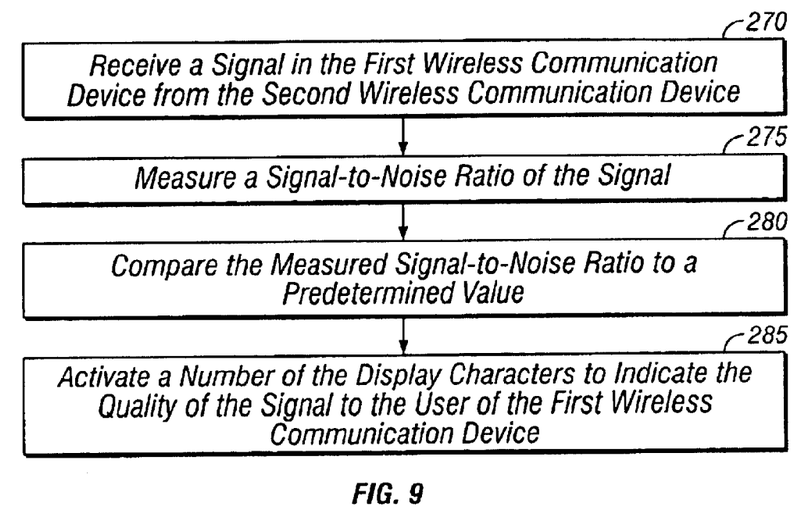
FIG. 9 is a flowchart of a method for generating and displaying a received signal quality indication using signal-to-noise ratio according to the embodiment of the present invention.

FIG. 9 is a flowchart of a method for generating and displaying a received signal quality indication using a signal-to-noise ratio of the signal according to the embodiment of the present invention. Referring to FIG. 9, the signal is received in the first wireless communication 105 device from the second wireless communication device 110. (step 270) The quality of the signal is determined by measuring a signal-to-noise ratio of the signal (step 275) and comparing the signal-to-noise ratio to the predetermined value. (step 280) In one embodiment, the predetermined value is a predetermined signal-to-noise ratio, and determining a quality of the signal involves dividing the signal-to-noise ratio of the signal by the predetermined signal-to-noise ratio. The quality of the signal is indicated to the user of the first wireless communication device 105 by activating a number of the display characters 210 corresponding to the result of the signal-to-noise ratio of the signal divided by the predetermined signal-to-noise ratio. (step 285) In another embodiment, (not shown) comparing the signal-to-noise ratio of the signal to the predetermined value is accomplished by comparing the signal-to-noise ratio of the signal to the look-up table to determine the quality of the signal involves obtaining from the look-up table a number of the display characters 210 to be activated.

Measuring the signal-to-noise ratio of the signal, step 275, is accomplished by measuring the strength of the signal and calculating the signal-to-noise ratio of the signal using the strength of the signal and a predetermined noise value. Although, because the noise is assumed to have a fixed value, this method yields only an approximation of the actual signal-to-noise ratio, the approximation is sufficiently accurate for purposes of determining signal quality because the majority of the noise arises from the receiver, here the first wireless communication device, and is directly proportional to the temperature of the receiver. Therefore, testing a representative population of wireless communication devices at operating temperature will yield a reasonably accurate value for the noise.

A computer program for performing each step of the above processes will now be described. The computer program generally includes: (i) a quality determination module for determining a quality of the signal relative to a predetermined value and (ii) an indication module for indicating to a user of the first wireless communication device the quality of the signal. In an embodiment where the signal is a digital signal, the quality determination module includes program code or instructions for measuring a bit-error-rate of the signal and comparing the bit-error-rate of the signal to the predetermined value. Where the signal includes several bytes each having at least one error checking bit appended thereto, the program code for measuring the bit-error-rate of the signal includes program code for checking the at least one error checking bit. Preferably, where the predetermined value includes a predetermined bit-error-rate, the program code includes program code for dividing the predetermined bit-error-rate by the bit-error-rate of the signal. More preferably, where the handset has a display with several display characters, the indication module includes program code for activating a number of the display characters 210 corresponding to a result of the predetermined bit-error-rate divided by the bit-error-rate of the signal. Alternatively, where the predetermined value includes a number of predetermined values in a lookup table in a memory in the handset, the quality determination module includes program code for comparing the bit-error-rate of the signal to the lookup table to determine the quality of the signal, and the indication module includes program code for obtaining from the lookup table a number of the display characters 210 to be activated and activating the number of the number of display characters.

In another embodiment, the quality determination module includes program code for measuring a signal-to-noise ratio of the signal. Generally, the program code for measuring a signal-to-noise ratio of the signal includes program code for measuring strength of the signal and calculating the signal-to-noise ratio of the signal using the strength of the signal and a predetermined noise value. Preferably, where the predetermined value includes a predetermined signal-to-noise ratio, the quality determination module includes program code for comparing the signal-to-noise ratio of the signal to the predetermined signal-to-noise ratio. More preferably, includes program code for dividing the signal-to-noise ratio of the signal by the predetermined signal-to-noise ratio. As above, the indication module includes program code for activating a number of the number of display characters 210 corresponding to a result of the signal-to-noise ratio of the signal divided by the predetermined signal-to-noise ratio. Also as above, where the predetermined value includes a number of predetermined values in a lockup table, the quality determination module includes program code for comparing the signal-to-noise ratio of the signal to the lockup table to determine the quality of the signal. The indication module can further include program code for obtaining from the lockup table a number of the display characters 210 to be activated.

Having described the present invention, it may be informative to again contrast the present invention with the technique described in U.S. Pat. No. 5,289,178. In the foregoing patent, what is displayed is the percentage of words or bits correctly received. In terms of gradations of link quality, in cellular applications, however, if less than about 97% of the bits are correctly received, the link may be regarded as very poor. Within the range of 97% to 100%, various other gradations may be distinguished. Whereas the foregoing patent does not describe or suggest how to effectively communicate such link gradation, or classification, information to the user, the present invention provides effective techniques for the same.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, although the preferred embodiment described herein is directed to mobile telecommunication systems, it will be appreciated by those skilled in the art that the teachings of the present invention can be adapted to other wireless communication systems used for communicating other types of information, such as wireless modems for communicating computer data, and satellite systems for communicating audio and television programs. Thus, the scope of the appended claims should not be limited to the preferred embodiments described herein.

What is claimed is:

1. A received signal quality indicator (RSQI) apparatus for determining a quality of a signal received by a first wireless communication device from a second wireless communication device, the signal comprising a number of bytes each having at least one bit, the RSQI apparatus comprising:

a bit-error-rate circuit to measure a bit-error-rate of the signal;

a comparator to compare the bit-error-rate of the signal to a predetermined value to determine a quality of the signal relative to the predetermined value; and an indicator to indicate to a user of the first wireless communication device the quality of the signal;

wherein the predetermined value comprises a predetermined relative signal quality measure, and wherein the comparator is configured to divide the predetermined bit-error-rate by the bit-error-rate of the signal.

2. A received signal quality indicator (RSQI) apparatus for determining a quality of a signal received by a first wireless communication device from a second wireless communication device, the signal comprising a number of bytes each having at least one bit, the RSQI apparatus comprising:

a bit-error-rate circuit to measure a bit-error-rate of the signal;

a comparator to compare the bit-error-rate of the signal to a predetermined value to determine a quality of the signal relative to the predetermined value; and an indicator to indicate to a user of the first wireless communication device the quality of the signal;

wherein the signal comprises an area identifier, and wherein the bit-error-rate circuit is configured to measure the bit-error rate in the area identifier as received in the first wireless communication device, whereby the quality of the signal is indicated to the user before the user initiates communication between the first wireless communication device and the second wireless communication device.

3. A received signal quality indicator (RSQI) apparatus for determining a quality of a signal received by a first wireless communication device from a second wireless communication device, the RSQI apparatus comprising:

a signal strength circuit to measure a strength of the signal;

a calculator to calculate a signal-to-noise ratio of the signal using the strength of the signal and a predetermined noise value specific to noise at the first wireless communication device;

a comparator to compare the signal-to-noise ratio of the signal to a predetermined value to determine a quality of the signal relative to the predetermined value; and an indicator to indicate to a user of the first wireless communication device the quality of the signal.

4. An RSQI apparatus according to claim 3 wherein the predetermined value comprises a predetermined relative signal quality measure, and wherein the comparator is configured to divide the signal-to-noise ratio of the signal by the predetermined signal-to-noise ratio.

5. An RSQI apparatus according to claim 3 wherein the predetermined value comprises a plurality of predetermined values in a look-up table in a memory in the first wireless communication device, and wherein the comparator is configured to compare the signal-to-noise ratio of the signal to the plurality of predetermined values in the look-up table.

6. A method for indicating received signal quality in a first wireless communication device, the method comprising the steps of:

receiving in the first wireless communication device a signal from a second wireless communication device; and determining a quality of the signal relative to a predetermined value; and indicating to a user of the first wireless communication device the quality of the signal;

wherein the signal comprises a number of bytes each having at least one bit, wherein the step of determining a quality of the signal comprises the steps of measuring a bit-error-rate of the signal; and comparing the bit-error-rate to the predetermined value; wherein the predetermined value comprises a relative signal quality measure, and wherein the step of comparing the bit-error-rate of the signal to the predetermined value comprises the step of dividing the predetermined bit-error-rate by the bit-error-rate of the signal.

7. A method for indicating received signal quality in a first wireless communication device, the method comprising the steps of:

receiving in the first wireless communication device a signal from a second wireless communication device;

determining a quality of the signal relative to a predetermined value; and indicating to a user of the first wireless communication device the quality of the signal, wherein the step of determining a quality of the signal comprises the step of measuring a signal-to-noise ratio of the signal by:

measuring a strength of the signal;

calculating the signal-to-noise ratio of the signal using the strength of the signal and a predetermined noise value specific to noise at the first wireless communication device.

8. A wireless communication system comprising: a first wireless communication device;

a second wireless communication device;

means for determining a quality of a signal received by the first wireless communication device from the second wireless communication device relative to a predetermined value; and means for indicating to a user of the first wireless communication device the quality of the signal;

wherein the means for determining a quality of a signal comprises means for measuring a signal-to-noise ratio of the signal, wherein the means for measuring a signal-to-noise ratio of the signal comprises a predetermined noise value specific to noise at the first wireless communication device and a means for measuring strength of the signal.

9. A wireless communication system according to claim 8, wherein the predetermined value comprises a predetermined signal-to-noise ratio, and wherein the means for determining a quality of a signal further comprises means for comparing the signal-to-noise ratio of the signal to the predetermined signal-to-noise ratio.

10. A computer program for determining a quality of a signal received by a first wireless communication device from a second wireless communication device, the computer program comprising:

a quality determination module for determining a quality of the signal relative to a predetermined value;

an indication module for indicating to a user of the first wireless communication device the quality of the signal;

wherein the signal comprises a number of bytes each having at least one bit, and wherein the quality determination module comprises program code for:

measuring a bit-error-rate of the signal; and comparing the bit-error-rate of the signal to the predetermined value;

wherein the predetermined value comprises a predetermined bit-error-rate, and wherein the program code for comparing the bit-error-rate of the signal to the predetermined value comprises program code for dividing the predetermined bit-error-rate by the bit-error-rate of the signal.

11. A computer program according to claim 10, wherein the first wireless communication device comprises a display having a plurality of display characters, and wherein the indication module comprises program code for activating a number of the plurality of display characters corresponding to a result of the predetermined bit error-rate divided by the bit-error-rate of the signal.

12. A computer program for determining a quality of a signal received by a first wireless communication device from a second wireless communication device, the computer program comprising:

a quality determination module for determining a quality of the signal relative to a predetermined value; and an indication module for indicating to a user of the first wireless communication device the quality of the signal;

wherein the signal comprises a number of bytes each having at least one bit, and wherein the quality determination module comprises program code for:

measuring a bit-error-rate of the signal; and comparing the bit-error-rate of the signal to the predetermined value;

measuring a signal-to-noise ratio of the signal by: measuring strength of the signal; and calculating the signal-to-noise ratio of the signal using the strength of the signal and a predetermined noise value specific to noise at the first wireless communication device.

13. A method of providing link classification information to a user of a communications apparatus communicating across a communications link, the method comprising:

obtaining a measure indicative of link performance, said measure being based on signal-to-noise ratio obtained using a predetermined noise value specific to noise at the communications apparatus;

mapping the measure of link performance to link classification information according to a non-linear relationship; and displaying the link classification information.

* * * * *